Nov. 11, 1947.　　　　　E. REICH　　　　　2,430,582
HEATING DEVICE
Original Filed Oct. 2, 1937　　　7 Sheets-Sheet 1
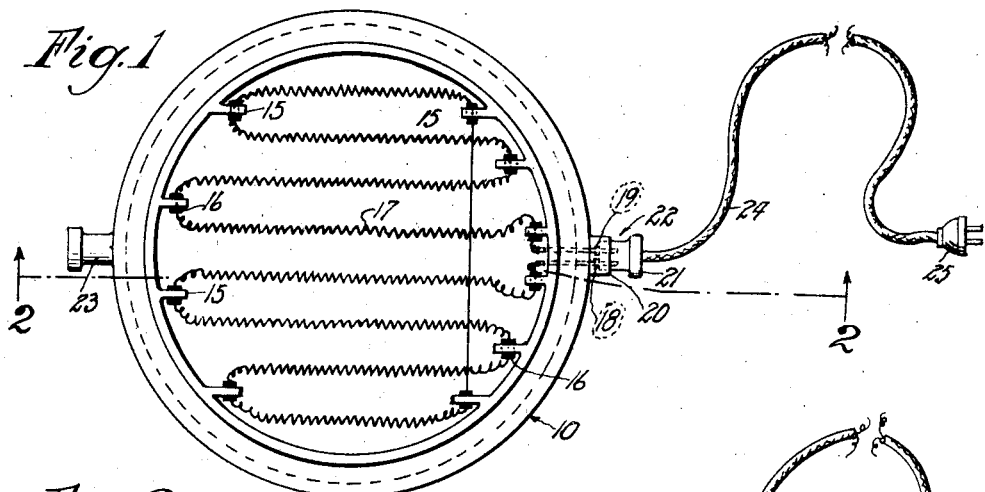
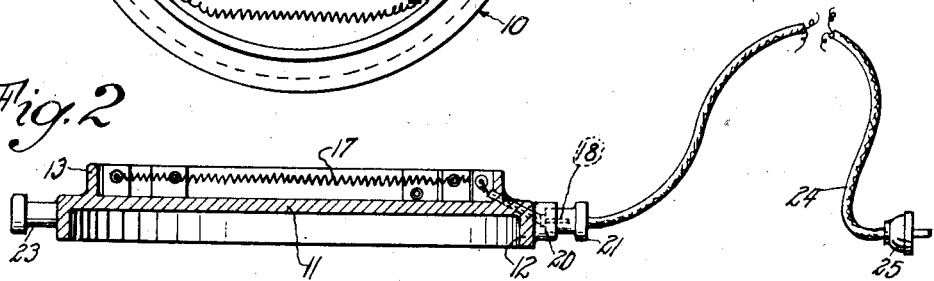
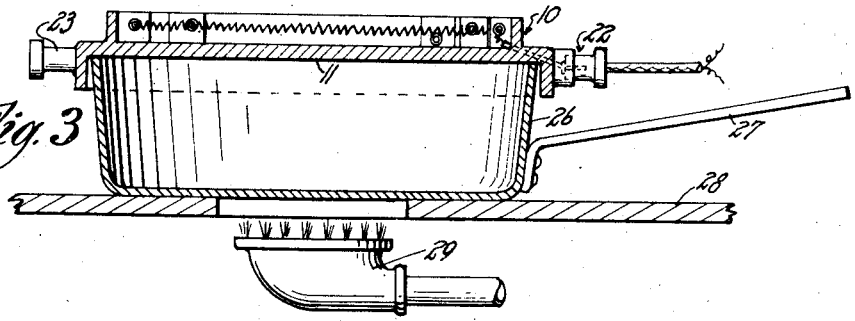
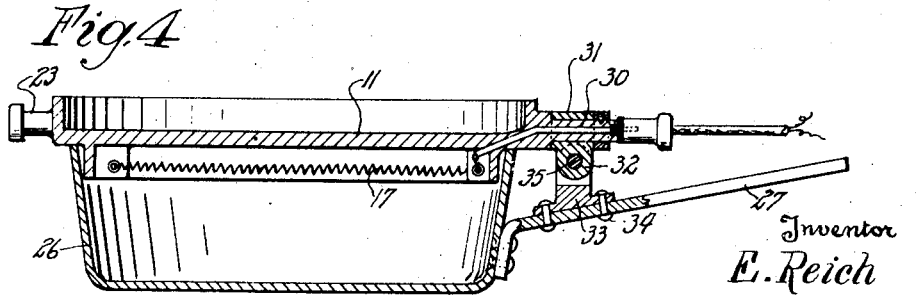
Inventor
E. Reich
By Merrill M. Blackburn
Attorney Nov. 11, 1947.  E. REICH  2,430,582
HEATING DEVICE
Original Filed Oct. 2, 1937   7 Sheets-Sheet 2
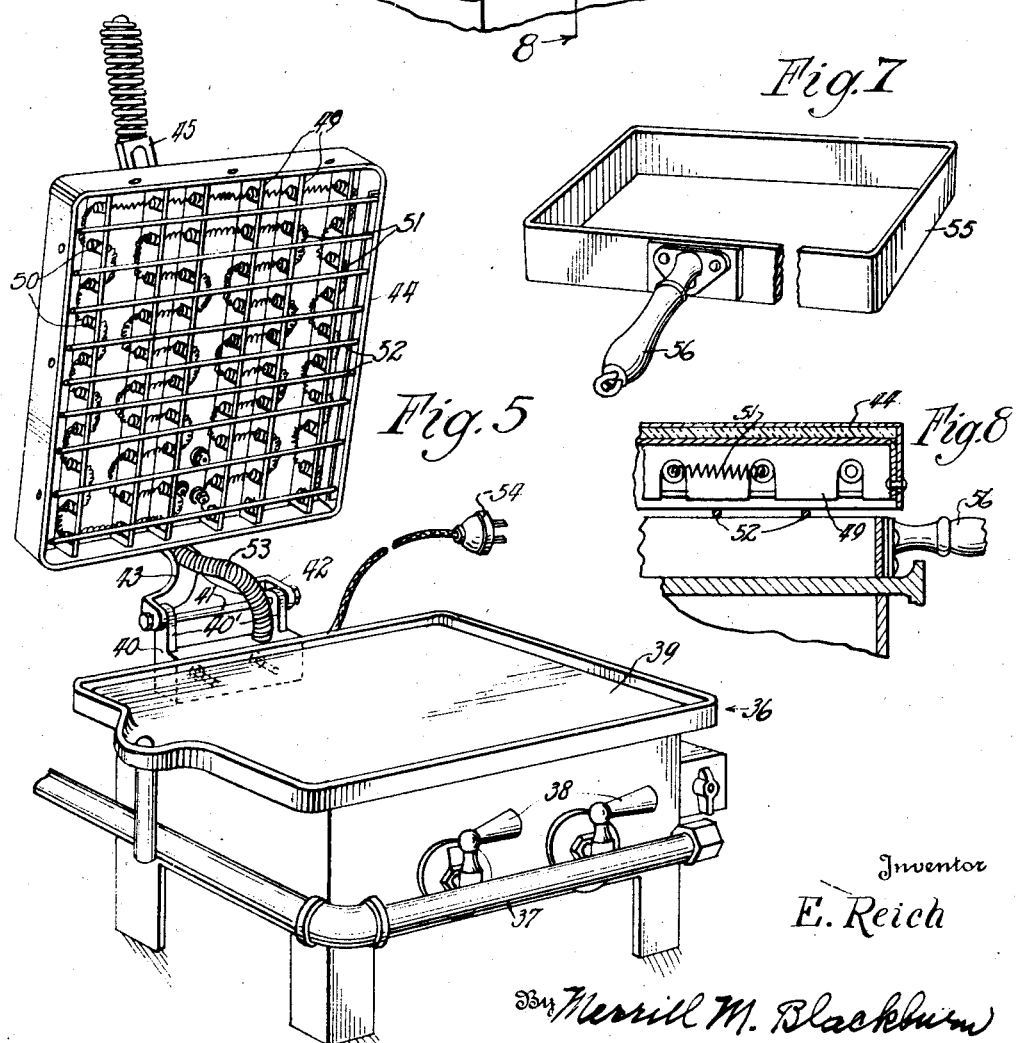
Inventor
E. Reich
By Merrill M. Blackburn
Attorney Nov. 11, 1947.  E. REICH  2,430,582
HEATING DEVICE
Original Filed Oct. 2, 1937   7 Sheets-Sheet 3

Inventor
E. Reich
By Merrill M. Blackburn
Attorney

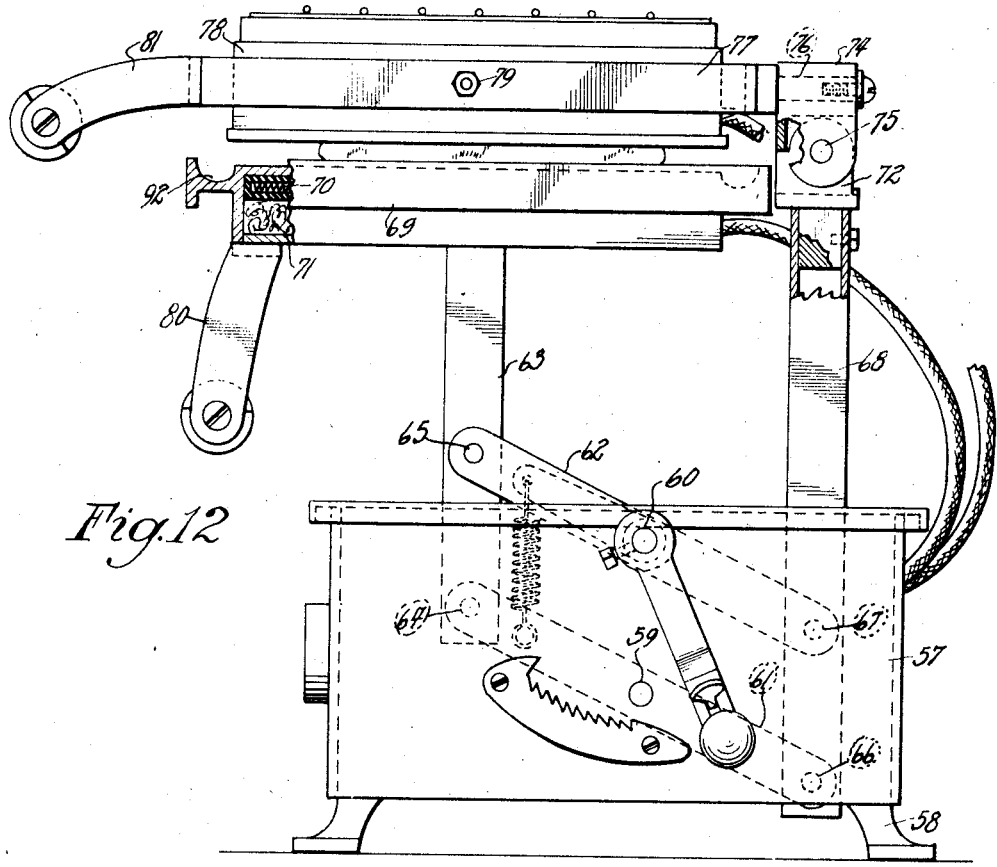

Nov. 11, 1947.   E. REICH   2,430,582
HEATING DEVICE
Original Filed Oct. 2, 1937   7 Sheets-Sheet 5
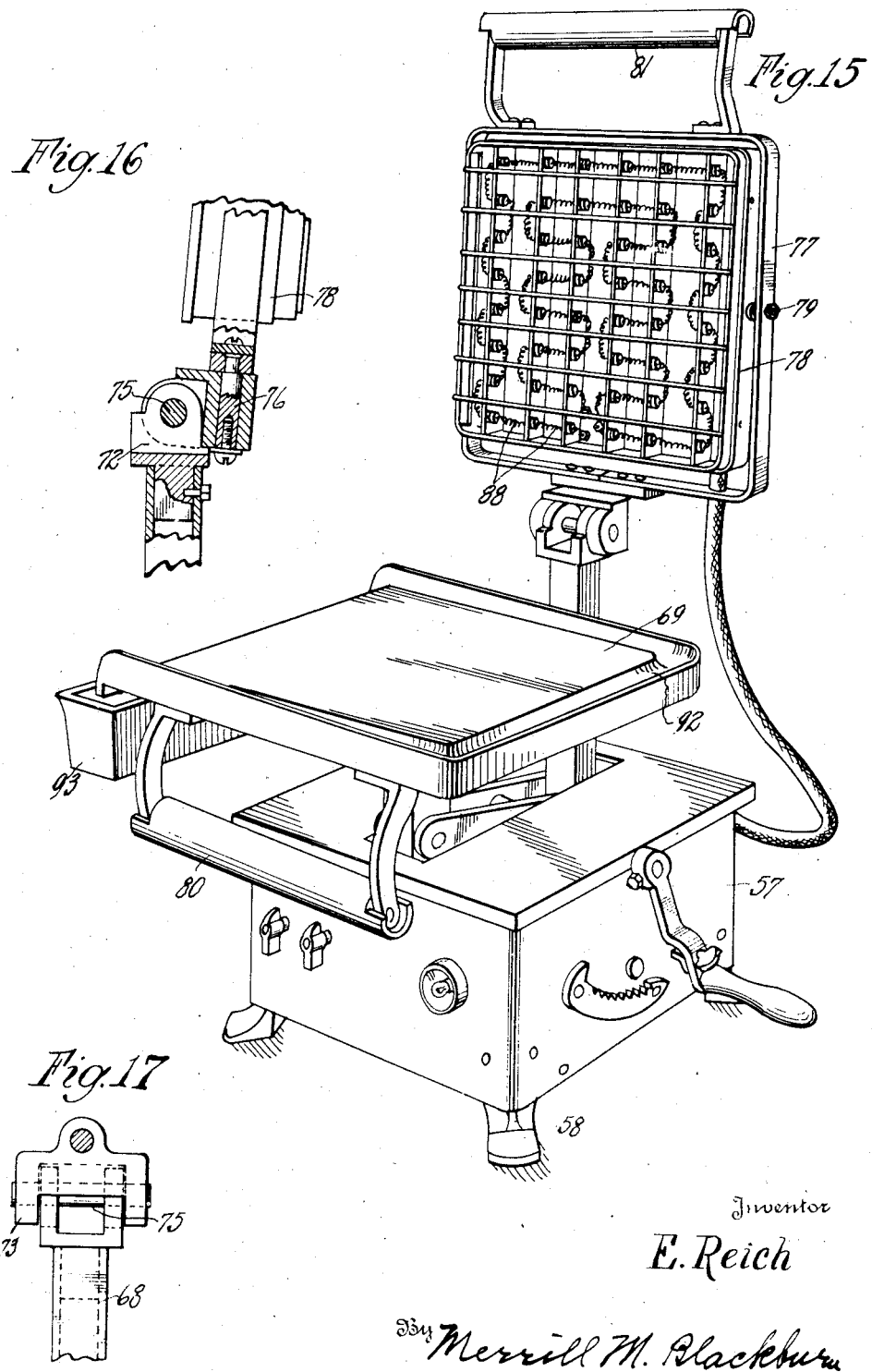
Inventor
E. Reich
By Merrill M. Blackburn
Attorney

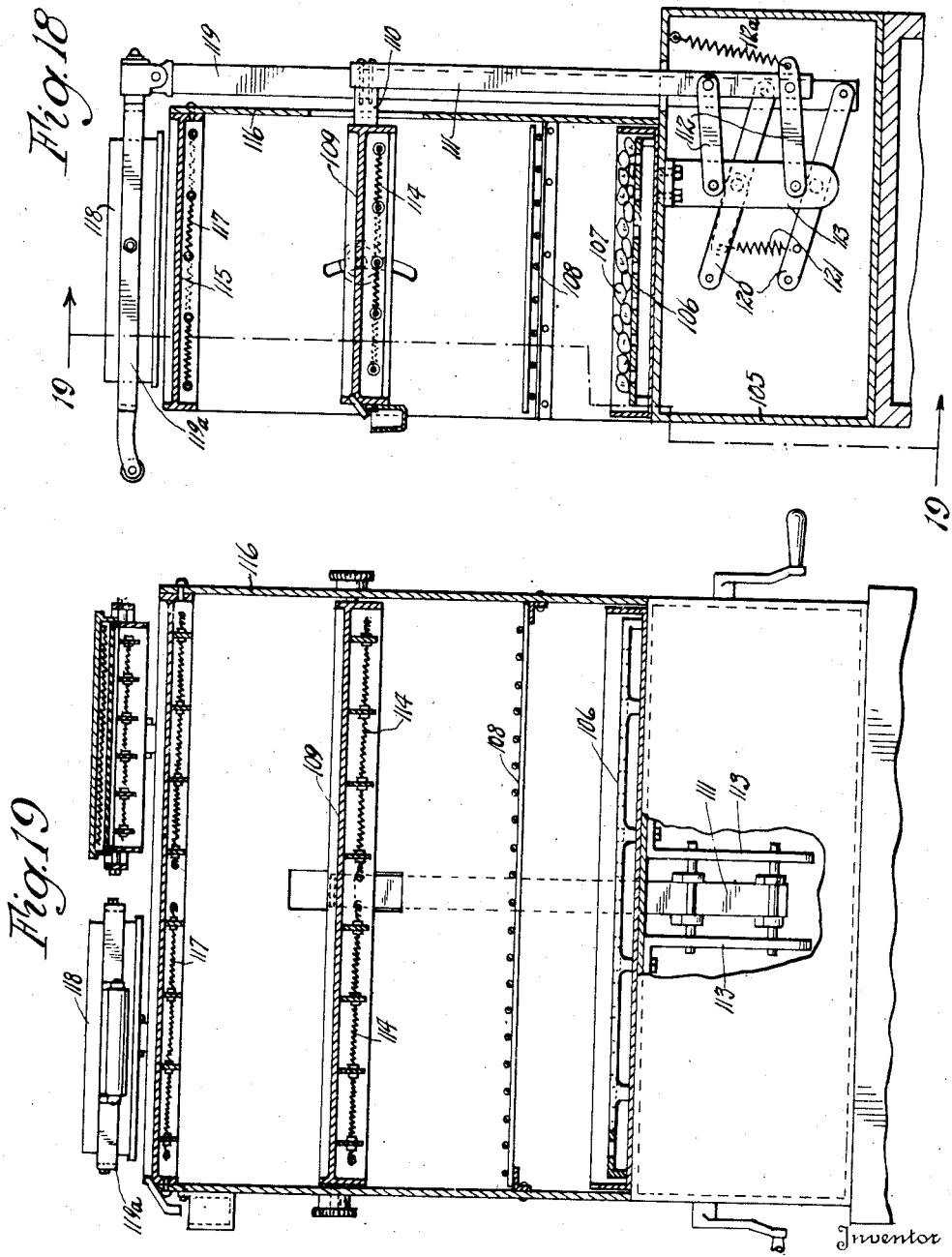

Nov. 11, 1947.  E. REICH  2,430,582
HEATING DEVICE
Original Filed Oct. 2, 1937    7 Sheets-Sheet 7
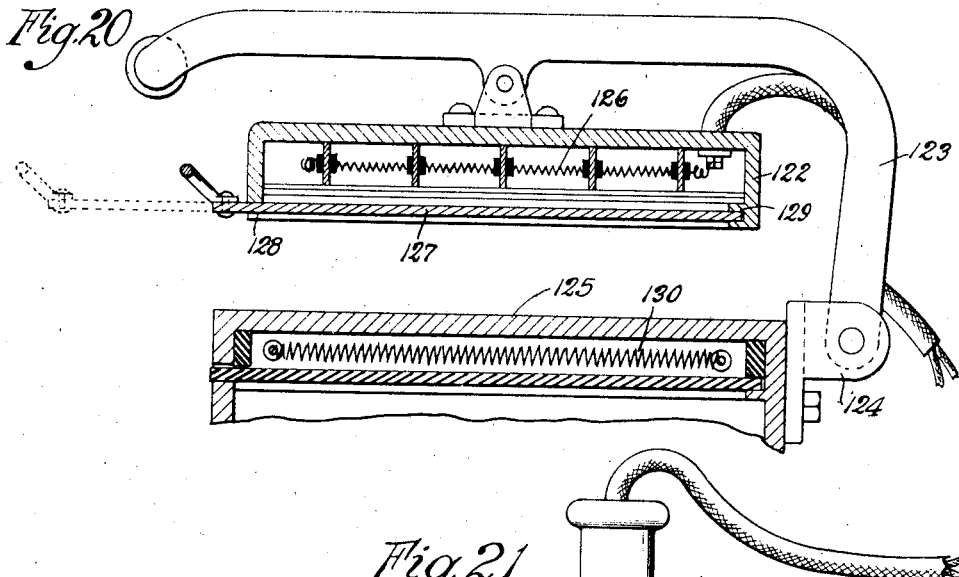
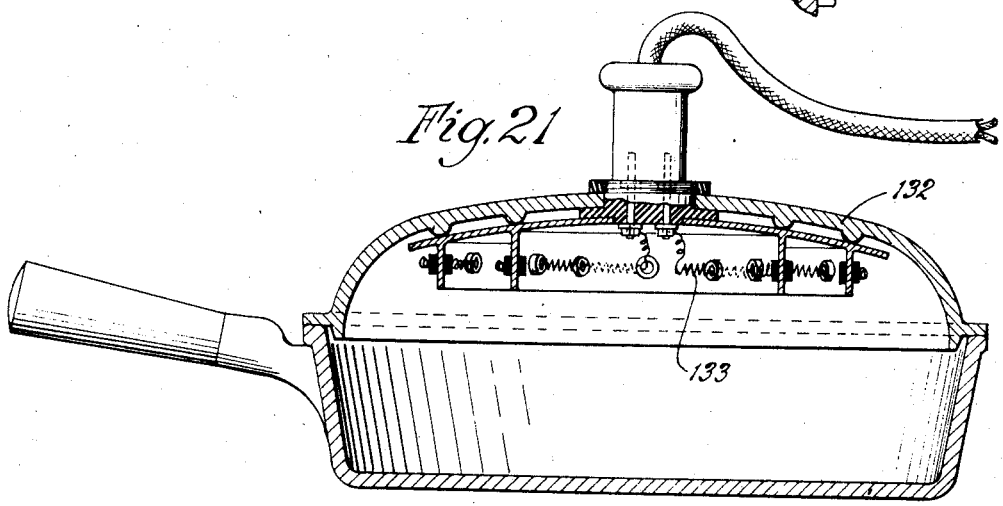
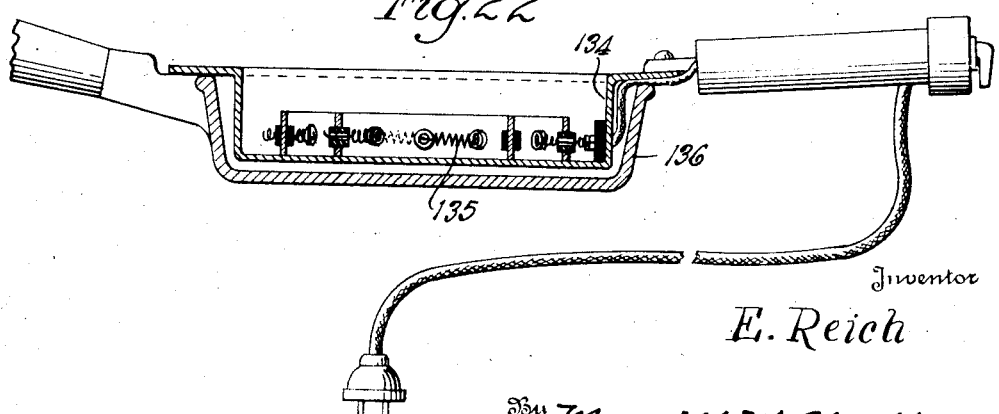
Inventor
E. Reich
By Merrill M. Blackburn
Attorney Patented Nov. 11, 1947

2,430,582

UNITED STATES PATENT OFFICE 2,430,582

HEATING DEVICE

Ernest Reich, Stamford, Conn.

Original application October 2, 1937, Serial No. 166,987, now Patent No. 2,313,968, dated March 16, 1943. Divided and this application July 2, 1942, Serial No. 449,519

2 Claims. (Cl. 219—1)

This invention relates to the art of preparing food and, more particularly, to a novel apparatus for imparting heat to food. While the present invention is described primarily in conjunction with the preparation of food, yet its utility extends beyond that scope and may be applied wherever heat influence is desired to modify, alter, or vary the physical or chemical properties of substances.

The art of preparing food includes boiling, frying, grilling, broiling, baking, toasting, roasting, and parboiling. In these various forms, the food is either exposed to conducted heat, such as by boiling, frying, or grilling, or is exposed to radiant glow heat, such as broiling and toasting. The distinction made between the two kinds of heat is based on whether or not the heat is directly received from the heat source or indirectly by the interposition of a conductor.

Among the objects of this invention are the provision of an apparatus for the application to food under pressure of conducted heat and of radiant glow heat; the provision of an apparatus for the application of conducted and radiant glow heat by which the food is cooked and by which desirable coloring thereof may be secured without diminishing the liquid content of the food to any appreciable extent; the provision of a heating element which, at one side, gives off conducted heat and, at its other side, radiant glow heat; the provision of a reversible heating element which emits conducted and radiant glow heat and which may cooperate with another heating element, applying either conducted or radiant glow heat to the food; the provision of a food cooker which may apply conducted heat to one side of the food and simultaneously apply radiant glow heat to the opposite side of the food whereby to produce desirable coloring of the food without substantial loss of moisture.

With these and other equally important objects in view, the invention comprises the means described in the following specification, particularly pointed out in the claims forming a part thereof and illustrated in the accompanying drawings, in which, Fig. 1 is a top plan view of a cover for a skillet constructed in accordance with my invention;

Fig. 2 is a section on the line 2—2 of Fig. 1;

Fig. 3 is a section through a skillet to which the cover is applied;

Fig. 4 is a view similar to Fig. 3 with the cover in reversed position and permanently secured to the skillet;

Fig. 5 is a perspective view of another form of heating device constructed in accordance with my invention;

Fig. 6 is a perspective view of the structure shown in Fig. 5 with the parts in operative position;

Fig. 7 is a broken perspective view of a frame used with the heating device;

Fig. 8 is a fragmentary section substantially along the plane indicated by the line 8—8 of Fig. 6;

Fig. 12 is a side view of the device shown in Fig. 9;

Fig. 13 is a sectional elevation of a stove constructed in accordance with my invention;

Fig. 14 is a perspective view of the oven casing;

Fig. 15 is a perspective view, similar to Fig. 9, with the top heating element reversed to bring the radiant heat in juxtaposition with the lower heating element;

Fig. 16 is a section through the pivotal joint for the upper heating element;

Fig. 17 is a front view of the joint when the element is in functional position;

Fig. 18 is a sectional side elevation of a further modification depicting a plurality of heating elements in tower arrangement;

Fig. 19 is a section on the line 19—19 of Fig. 18;

Fig. 20 is a section through a modification of the device shown in Fig. 5;

Fig. 21 is a section through a modification of a skillet shown in Fig. 3; and

Fig. 22 is a section through a further modification of a skillet.

Figure 9:
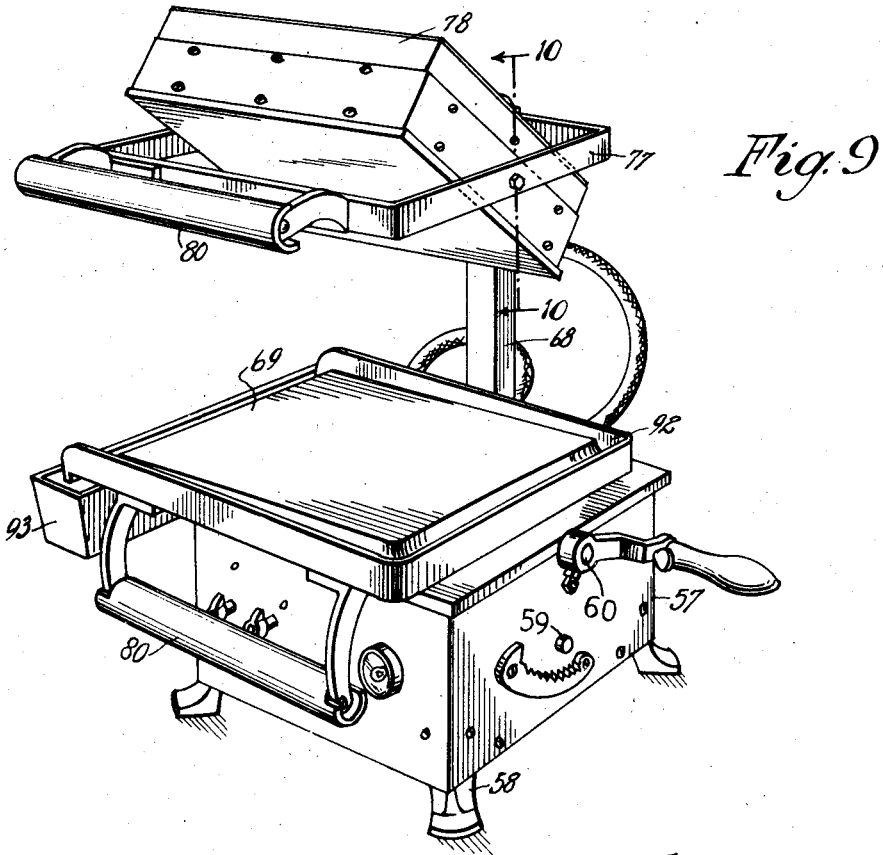
Fig. 9 is a perspective view of a heating device wherein one of the heating elements is constructed to emit conducted heat at one side and radiant glow heat at the other side.

From time immemorial food has been cooked by bringing the food into contact with a plate of metal or other suitable substance which is heated by gas, coal, electricity, or some other means. The heat thus generated and conducted through the plate is imparted by contact with the food, and such heat is designated as "conducted heat." If the food is exposed to the influence of heat from a flame or the like acting directly on the food without the interposition of a conductor, it may be designated as "radiant glow heat." In the preparation of food, flavor and appearance, in addition to the retention of the natural juice of the food, are important factors.

The apparatus disclosed herein may be utilized in various ways in the preparation of food and I therefore do not wish to be limited in any way to any particular method of cooking, all methods of utilization of the apparatus herein disclosed being regarded as coming within the normal field of use of this apparatus. Preferably, although not necessarily, the food is subjected to pressure while under the influence of both conducted and radiant glow heat.

Referring more in detail to the annexed drawings, and particularly to Figs. 1 to 4, inclusive, there is shown a cover which is designated in general by the numeral 10. This comprises a disc 11 formed with a downwardly extending annular flange 12 adapted to encompass a skillet or other cooking utensil. While the disc in the present instance is shown circular, it is, of course, understood that any other shape or configuration may be selected to conform to the contour of the particular cooking utensil. The disc is also provided with an upstanding annular flange 13 of smaller diameter than the disc 11 so that, upon reversal of the cover, the flange 13 projects into a cooking utensil.

The flange 13 is provided with a plurality of lugs 15 which are apertured to receive insulating bushings 16 through which is strung a heating element or wire 17, the ends of which lead to contact terminals 18 and 19 in a socket 20 adapted to receive a plug 21 which complements said socket to provide a handle 22. Diametrically opposite to the handle 22 is another handle 23, whereby manipulation of the cover is facilitated.

From the plug 21 leads a cable 24 to another plug 25, which may be inserted in the usual house socket constituting a source of electrical energy for heating the wire 17. In Fig. 3, the cover is applied to a skillet 26 equipped with a handle 27 and shown on the top plate 28 of a kitchen stove where a burner 29 supplies heat to the skillet. The food in the skillet may be subjected to the conducted heat emitted from the skillet and the cover 10, when in the position shown in Fig. 3, or may be subjected to radiant glow heat from the heating element 17, when arranged in the position shown in Fig. 4.

In Fig. 4, the cover is slightly modified to be permanently attached to the skillet. Instead of the handle 22, the cover is provided with a trunnion 30 which has a central bore for the passage of the wires 17. The trunnion is received in a bearing 31 formed with a downwardly extending lug 32 received in a U-shaped bracket 33 secured to the skillet handle 27 by rivets 34 or other fastening means. A pivot pin 35 passes through the bracket 33 and the lug 32. It is evident that the cover may be tilted about the pin 35 and also rotated about the trunnion 30 in the bearing 31 so that the heating element may be received within the skillet or be extraneous thereto, depending on whether conducted heat or radiant glow heat is to be supplied from the top.

Referring to Figs. 5 to 8, inclusive, 36 designates a gas range provided with a pipe 37 and valves 38 for the supply and control of gas, and a plate 39 which supplies conducted heat to the articles placed thereon. The gas heater may be of the construction shown, but any standard range, heated by any kind of fuel, may be employed, it being the intention to apply the invention of a heating element thereto as an attachment.

At the rear, the range or heater has secured thereto a bracket 40 which is provided with spaced upstanding lugs 40', through which extends a pivot pin 41 which also projects through lugs 42 of an arm 43, to which is loosely secured a heating member 44 which is auxiliary and adapted to cooperate with the plate 39. As shown in Fig. 6, the arm is in the form of a goose neck terminating in a handle 45 and having prongs 46, into the bifurcated ends of which extend lugs 47 of a bearing plate 48, secured to the prongs by pivot pins.

The member 44 is formed as a casing closed at the top and sides but open at the bottom. The chamber so formed is divided by a plurality of parallel partitions 49 in which are received insulator bushings 50 through which the heating element 51, in the form of a wire, is strung. Rods 52 extend crosswise to the partitions and are secured to the sides of the plate to form a protective grating. The heating element is conducted through an armored cable 53 and thence leads to a plug 54 to be connected to a house socket. In use, the heating member or plate 44 is lowered into a position parallel with the plate 39, so that food articles placed on the plate 39 receive conducted heat from below and radiant glow heat from above.

If desired to speed up the cooking process, the space between the plates 39 and 44 may be closed by a rectangular frame 55 which has a handle 56 and is adapted to span the gap between the heating plates. It is evident from the foregoing description that the auxiliary plate constitutes an attachment which may be separately manufactured and secured to any range already in existence.

Figure 10:
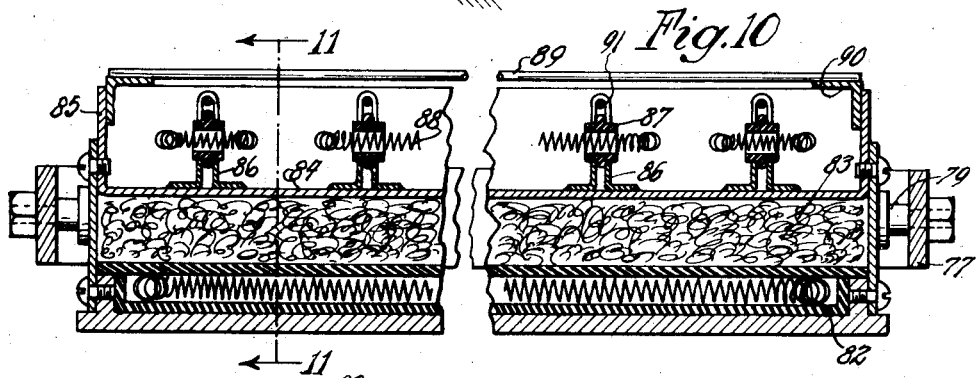
Fig. 10 is an enlarged section on the line 10—10 of Fig. 9.
Figure 11:
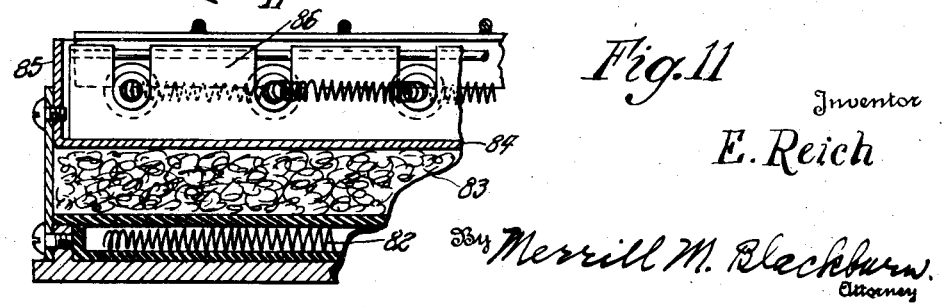
Fig. 11 is a fragmentary section on the line 11—11 of Fig. 10.

Referring to Figs. 9 to 12 and 15 to 17, inclusive, the heating device depicted therein is of the type disclosed in, and an improvement on, United States Letters Patent No. 1,839,112, issued December 29, 1931. The device includes a base 57, comprising an upstanding hollow shell substantially rectangular in cross section and borne by legs 58. Transverse shafts 59 and 60, secured in said base, have, loosely mounted thereon, two pairs of rocking levers 61 and 62, respectively. The levers are pivotally secured at the forward ends to a vertical post 63, as at 64 and 65, whereby the levers are maintained at all times in parallel relation to each other and the post in vertical position.

At their rear ends, the levers 61 and 62 are pivotally attached as at 66 and 67 to a vertical post 68. The post 63 supports a heating member or plate 69 which is hollow and contains an electrical heating element 70 located close to the cooking surface but insulated therefrom in any approved manner. The chamber is filled with asbestos or other suitable heat-confining and insulating material 71. Mounted on the post 68 is a bracket 72 which is received between downwardly extending lugs 73 of a bearing 74 and transversed by a pivot pin 75.

Into the bearing 74 extends a trunnion 76 of a rectangular frame 77 encompassing the upper heating member or plate 78 and secured thereto by pivot screws 79. The lower plate 69 has a handle 80, whereas the frame 77 has a handle 81 to facilitate manipulation of the upper plate 78.

The upper heating member is hollow and has a heating element 82 near the lower cooking surface, insulated therefrom in any appropriate manner and having a layer of asbestos 83 located above the heating element. A partition 84 closes the chamber, above the asbestos, and is bent upwardly to provide side walls 85. On the partition 84 are secured the lateral flanges of U-shaped plates 86 having cut away portions to receive insulators 87 through which a heating element 88 is strung.

The top of this heating element is open and has grating rods 89 secured at their ends to angle irons 90 which are fastened to the upper ends of the side walls 85. Rods 91 are situated in the bights of the U-shaped plates 86 and secured to the side walls 85.

It is evident that, by the provision of the trunnion 76, either the heating element 82, furnishing conducted heat, or the heating element 88, furnishing radiant glow heat, may be arranged to cooperate with the lower heating plate.

Normally the rocking levers 61, 62 are movable freely about the shafts 59, 60, and the two plates 69, 78, through their peculiar supporting arrangements, are counterbalanced. It is thought unnecessary to describe the mechanism for varying the distance between the heating members and, thereby, varying the pressure on the interposed food material, at the will of the operator, as these features, per se, do not form the subject matter of the present invention. Attention is called to the fact that the upper plate 78 is suspended in the frame 77 in such a manner that, when the plate is in raised position, it slants rearwardly and downwardly so that a greater open space is afforded for the introduction of food, and, also, grease on the plate will run down and drop into the groove 92 of the lower plate 69, and thence into the trough 93.

In Figs. 13 and 14, a heating device is depicted which functions as a stove. A casing 100 of rectangular form and open at the top and bottom is interposed between an upper heating member 101 and a lower heating member 102. The lower member emits conducted heat while the upper member has a grill 103 capable of emitting radiant glow heat. It is, of course, within the scope of the invention to reverse the heating effects, so that the lower member may emit radiant glow heat while the upper member may emit conducted heat. The casing is provided with a door 104 affording access to the heating chamber, defined by the casing. The plates 101 and 102 can be actuated to approach and recede from one another, as has been mentioned in the previously described embodiment.

The modification shown in Figs. 18 and 19 depict a plurality of heating devices arranged in superposed relation, and illustrate a combination arrangement producing radiant glow heat by charcoal and by electricity. As shown, a hollow casing 105, constituting a base, is provided, on which is mounted a grate 106, forming a support for a layer of charcoal 107, so that upon ignition, radiant glow heat is emitted to the food placed on a second grate 108 above the grate 106.

A heating member or plate 109 is secured to an arm 110 of a post 111 which is connected by parallel links 112 to pendent brackets 113 secured to the top of the base 105. The lower link 112 is connected by a spring 112a to the base 105. The plate 109 is provided at the lower side with an exposed heating element 114 for the emission of radiant glow heat, while the upper side emits conducted heat. Again, a plate 115 is provided at the top of a casing 116 mounted on the base 105. The plate 115 is constructed similar to plate 109 and is adapted to emit radiant glow heat, through its exposed heating element 117, and conducted heat at the opposite side. A plurality of cooperating heating members or plates 118 are mounted in frames 119a, pivotally secured to posts 119, which are connected by parallel links 120 to the bracket 113. The links extend beyond the brackets and are connected by a spring 121. The purpose of providing the tower arrangement of superposing various heating elements is to make this device especially desirable for commercial establishments, steamships, trains, and all other places where space in lateral direction is limited.

The provision of a device with a large number of heating plates, with various kinds of heating surfaces, has the advantage that all kinds of cooking processes, such as frying, toasting, broiling, baking, and the like, may be carried out in one and the same apparatus and at one and the same time, so that the efforts of a chef are concentrated in one place and precludes the hitherto necessity of caring for several devices remote from one another. A further advantage is that, by superposing the heating plates, heat is concentrated and conserved for effective use and losses, due to wasteful radiation, are reduced to a minimum.

The modification shown in Fig. 20 discloses the same type of heating device as illustrated in Fig. 5, and has the top heating plate 122 secured to an arm 123, pivotally secured to a bracket 124, fastened to a lower heating plate 125. As shown, the heating plate 122 is hollow and open at the bottom to permit radiant glow heat to emit from the heating element 126. If desired, the radiant glow heat of the upper plate may be converted into conducted heat and, to this end, a plate 127 is provided which may be inserted through a slot 128 and is finally seated in a groove 129 and serves to close up the lower open end of the plate 122.

Upon the insertion of the plate 127, heat is transmitted therethrough, so that, instead of radiant glow heat, conducted heat is emitted. The plate 127 may be of steel, cast iron, aluminum, or copper, depending upon the speed with which the heat is to be emitted. In the case of steel or cast iron, more time is consumed with the heating up process than when aluminum or copper is employed. The lower plate 125 has a heating element 130 under which insulation is provided to restrict the heat from conduction. The layer of insulation may be removed and, instead, a plate, similar to plate 127, may be inserted, so as to cause conducted heat to be emitted.

The modification shown in Fig. 21 is a skillet which has a cover 132 in which a heating element 133 is built, capable of emitting radiant glow heat. In Fig. 22, the cover 134 is drawn deep so that the heating element 135, through the bottom of the cover, emits conducted heat and, at the same time, the cover is capable of applying pressure on the food, arranged on the bottom of the utensil 136. Upon reversal of the cover, of course, radiant glow heat is emitted.

This is a division of my application, Serial No. 166,987, filed October 2, 1937, now Patent No. 2,313,968, issued March 16, 1943.

While the drawings show preferred embodiments of my invention, various changes and modifications may be made within the scope of the appended claims. I, therefore, do not wish my claims limited to a greater degree than is necessitated by the state of the prior art.

Having now described my invention, I claim:

1. In a heating device having a supporting base, a plurality of heating members supported thereabove for vertical reciprocating movement, and actuating means associated with the base for producing relative reciprocating movement of the heating members; one of the heating members having a heating unit therein, and a plate upon one face thereof to be heated by the heating unit and to conduct heat to an object with which the plate is in contact, the opposite face of the heating member being open and emitting radiant glow heat to an object being heated, said heating member, besides being vertically movable, being reversible about a horizontal axis, whereby to make it possible to use said heating member either side up or down.

2. A heating device having a pair of directly cooperating heating members arranged one above the other, the lower of said members being electrically heated and having a metal covering plate for the electric heating unit closely adjacent thereto, the upper of said heating members being electrically heated and supported by a frame in which it is pivotally mounted to be reversible within the frame and having its heating conductor directly exposed to the object to be heated whereby to apply radiant glow heat thereto, the reversible heating member having two electrical heating units and being capable of having its two heating units used independently or simultaneously and being capable of being used either side up.

ERNEST REICH.

REFERENCES CITED

The following references are of record in the file of this patent:

UNITED STATES PATENTS

| Number | Name | Date |
|---|---|---|
| 1,179,986 | Warner | Apr. 18, 1916 |
| 1,375,801 | Ross | Apr. 26, 1921 |
| 1,102,392 | Denhard | July 7, 1914 |
| 2,108,778 | Morgan | Feb. 15, 1938 |
| 1,077,866 | Ball | Nov. 4, 1913 |
| 1,751,219 | Seamon | Mar. 18, 1930 |
| 2,198,645 | Wolcott | Apr. 30, 1940 |
| 1,208,637 | Phelps | Dec. 12, 1916 |

FOREIGN PATENTS

| Number | Country | Date |
|---|---|---|
| 562,207 | Germany | Oct. 22, 1932 |